United States Patent
Schoonmaker et al.

(10) Patent No.: US 7,460,167 B2
(45) Date of Patent: Dec. 2, 2008

(54) TUNABLE IMAGING SENSOR

(75) Inventors: Jon Stuart Schoonmaker, San Diego, CA (US); Joseph James Dirbas, San Diego, CA (US); Andrew Bruce Bush, Lakeside, CA (US); J. Antonio Mireles, Coronado, CA (US)

(73) Assignee: PAR Technology Corporation, New Hartford, NY (US)

( * ) Notice: Subject to any disclaimer, the term of this patent is extended or adjusted under 35 U.S.C. 154(b) by 645 days.

(21) Appl. No.: 10/825,045

(22) Filed: Apr. 15, 2004

(65) Prior Publication Data

US 2004/0223069 A1 Nov. 11, 2004

Related U.S. Application Data

(60) Provisional application No. 60/463,750, filed on Apr. 16, 2003.

(51) Int. Cl.
*H04N 5/225* (2006.01)
*H04N 9/09* (2006.01)
*H04N 9/083* (2006.01)
*G02B 3/00* (2006.01)

(52) U.S. Cl. ............... 348/360; 348/374; 348/265; 348/262; 359/722

(58) Field of Classification Search ......... 348/262–265, 348/373–376, 360; 359/722
See application file for complete search history.

(56) References Cited

U.S. PATENT DOCUMENTS

| | | | | |
|---|---|---|---|---|
| 5,016,091 A * | 5/1991 | Choi | ............... | 348/224.1 |
| 5,070,407 A * | 12/1991 | Wheeler et al. | ............. | 348/342 |
| 5,387,958 A * | 2/1995 | Pashley | ............... | 396/457 |
| 5,694,165 A * | 12/1997 | Yamazaki et al. | ........ | 348/218.1 |
| 5,751,429 A * | 5/1998 | Wada et al. | .............. | 356/418 |
| 5,982,423 A * | 11/1999 | Sekiguchi | ............... | 348/216.1 |
| 5,986,767 A * | 11/1999 | Nakano et al. | ............. | 356/419 |
| 6,611,289 B1 * | 8/2003 | Yu et al. | .................. | 348/265 |
| 6,640,002 B1 * | 10/2003 | Kawada | .................. | 382/141 |
| 6,643,457 B2 * | 11/2003 | Chen | ...................... | 396/74 |
| 6,765,617 B1 * | 7/2004 | Tangen et al. | ............... | 348/340 |
| 6,833,873 B1 * | 12/2004 | Suda | ...................... | 348/340 |
| 6,961,086 B1 * | 11/2005 | Ichikawa | ............... | 348/223.1 |
| 7,123,298 B2 * | 10/2006 | Schroeder et al. | ........... | 348/273 |
| 7,262,799 B2 * | 8/2007 | Suda | ...................... | 348/280 |
| 7,417,684 B2 * | 8/2008 | Watanabe et al. | .......... | 348/363 |
| 7,423,684 B2 * | 9/2008 | Notagashira | .............. | 348/342 |

(Continued)

FOREIGN PATENT DOCUMENTS

JP 08185088 A * 7/1996

(Continued)

*Primary Examiner*—John M Villecco
(74) *Attorney, Agent, or Firm*—George R. McGuire; Bond Schoeneck & King, PLLC (57) ABSTRACT

A tunable imaging sensor includes a housing with four lenses mounted on a front side. A removable or rotatable filter plate/wheel fits inside the enclosure adjacent the lenses, with a camera plate holding four CMOS or CCD imagers fitting inside the enclosure adjacent the filter plate/wheel. The filter plate includes four filters, one for each lens, while the filter wheel includes sixteen filters which are rotated into position so that four filters are always aligned with the lenses and imagers. Rotating the filter wheel provides sixteen different filter combinations for the sensor. The images from each of the imagers are processed to form a composite image.

15 Claims, 9 Drawing Sheets

U.S. PATENT DOCUMENTS

| | | | |
|---|---|---|---|
| 2002/0030755 A1* | 3/2002 | Uchino | 348/342 |
| 2002/0044212 A1* | 4/2002 | Hashimoto | 348/335 |
| 2002/0089596 A1* | 7/2002 | Suda | 348/302 |
| 2002/0113888 A1* | 8/2002 | Sonoda et al. | 348/315 |
| 2003/0098918 A1* | 5/2003 | Miller | 348/273 |
| 2003/0147002 A1* | 8/2003 | Ray et al. | 348/370 |
| 2003/0193564 A1* | 10/2003 | Jenkins | 348/182 |
| 2004/0240052 A1* | 12/2004 | Minefuji et al. | 359/435 |
| 2005/0083431 A1* | 4/2005 | Tsutsumi | 348/360 |
| 2007/0097249 A1* | 5/2007 | Korenaga | 348/335 |
| 2007/0252908 A1* | 11/2007 | Kolehmainen | 348/265 |
| 2007/0291982 A1* | 12/2007 | Sung et al. | 382/101 |

FOREIGN PATENT DOCUMENTS

| | | | |
|---|---|---|---|
| JP | 08223477 A | * | 8/1996 |
| JP | 2003324748 A | * | 11/2003 |

* cited by examiner

TUNABLE IMAGING SENSOR

CROSS-REFERENCE TO RELATED APPLICATIONS

This application claims priority from U.S. Provisional Application Ser. No. 60/463,750 filed Apr. 16, 2003 and entitled TUNABLE IMAGING SENSOR, incorporated herein by reference.

FIELD OF THE INVENTION

This invention relates generally to the field of imaging sensors, and more particularly to an imaging sensor that can be tuned via various filters.

BACKGROUND OF THE INVENTION

Multispectral imaging systems record spatial pictures of an image scene in many different spectral wavelength bands, for example, a scene image at red wavelength, green wavelength and at blue wavelength. Differences are also detected when using polarized light of different polarization angles. Differences in the observed spatial image at different wavelengths are useful for finding hidden targets, assaying agricultural conditions, and detecting other subtle features that would not be noticed in a video picture of the scene.

SUMMARY OF THE INVENTION

Briefly stated, a tunable imaging sensor includes a housing with four lenses mounted on a front side. A removable or rotatable filter plate/wheel fits inside the enclosure adjacent the lenses, with a camera plate holding four CMOS or CCD imagers fitting inside the enclosure adjacent the filter plate/wheel. The filter plate includes four filters, one for each lens, while the filter wheel includes sixteen filters which are rotated into position so that four filters are always aligned with the lenses and imagers. Rotating the filter wheel provides sixteen different filter combinations for the sensor. The images from each of the imagers are processed to form a composite image.

According to an embodiment of the invention, a tunable imaging sensor includes a housing; a lens plate attached to a front of said housing; a filter plate inside said housing adjacent said lens plate; a camera plate inside said housing adjacent said filter plate; a plurality of imagers mounted on said camera plate; a plurality of lenses mounted on said lens plate; a plurality of filters mounted on said filter plate; said lens plate, said filter plate, and said camera plate being aligned such that radiation passing through one of said lenses passes through one of said plurality of filters onto one of said imagers.

According to an embodiment of the invention, a tunable imaging sensor system includes a housing; first means for mounting a plurality of lenses in said housing; second means for mounting a plurality of filters adjacent said plurality of lenses in said housing; third means for mounting a plurality of imagers adjacent said plurality of filters in said housing; wherein said first means, said second means, and said third means are aligned such that radiation passing through one of said lenses passes through one of said plurality of filters onto one of said imagers.

DETAILED DESCRIPTION OF THE PREFERRED EMBODIMENT

Figure 1:
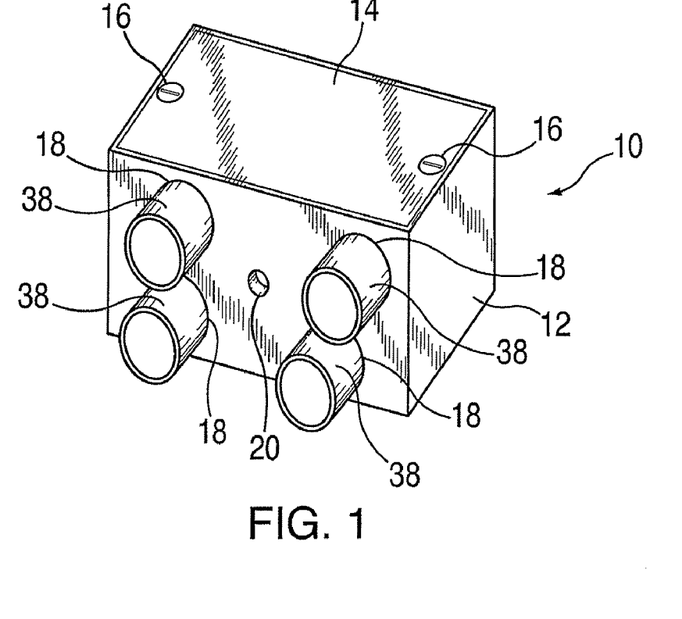
FIG. 1 shows a perspective view of a sensor assembly according to a first embodiment of the invention.
Figure 2:
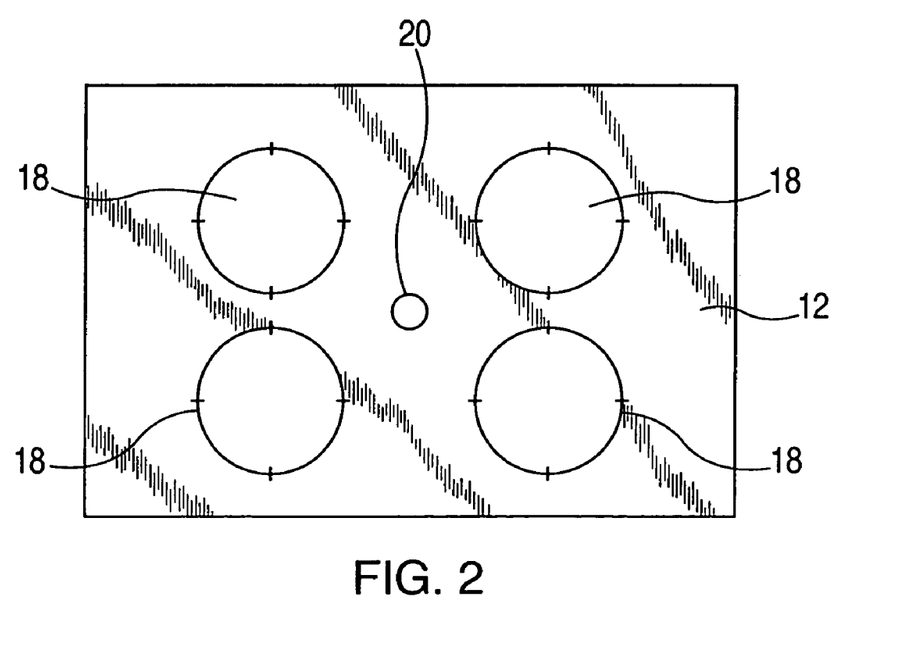
FIG. 2 shows a sensor housing for the first embodiment of the invention.

Referring to FIGS. 1-2, the first embodiment of the present invention is a small medium scale integration (MSI) sensor 10. The first embodiment is an extremely low-cost, low power, light weight temporally simultaneous spectral imager for a variety of applications. The first embodiment sensor is a four aperture four CMOS camera system, in which the CMOS cameras are synchronized to produce four temporally simultaneous channels of analog RS-1 70 data. The first embodiment weighs less than 5 pounds and requires 5 volt DC power.

Sensor 10 includes a housing 12 which is generally rectangular in shape, with a lid 14. Lid 14 is removably fastened to housing 12 preferably by screws, but any fastener capable of repeated removals will suffice. A front of housing 12 contains four holes 18 for attaching four standard C-Mount lenses 38. An alignment hole 20 is generally centered in the front of housing 12.

Figure 3A:
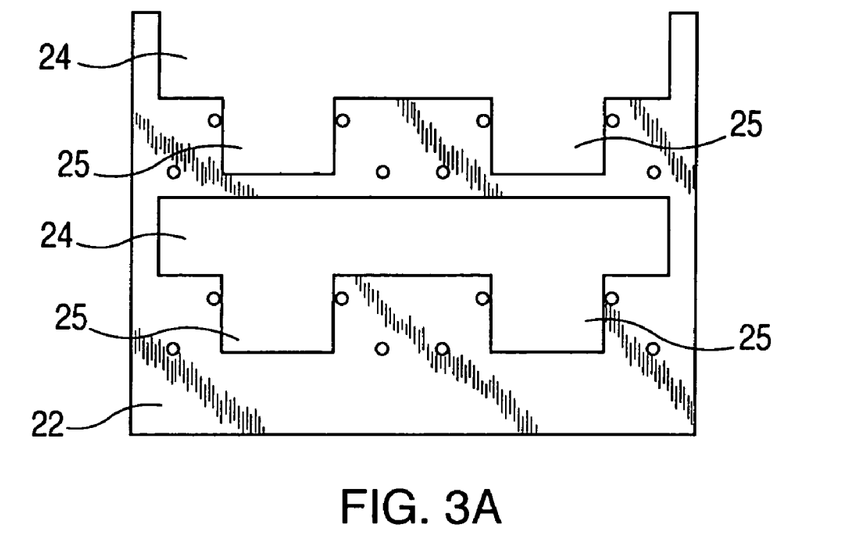
FIG. 3A shows a camera plate according to the first embodiment of the invention.
Figure 3B:
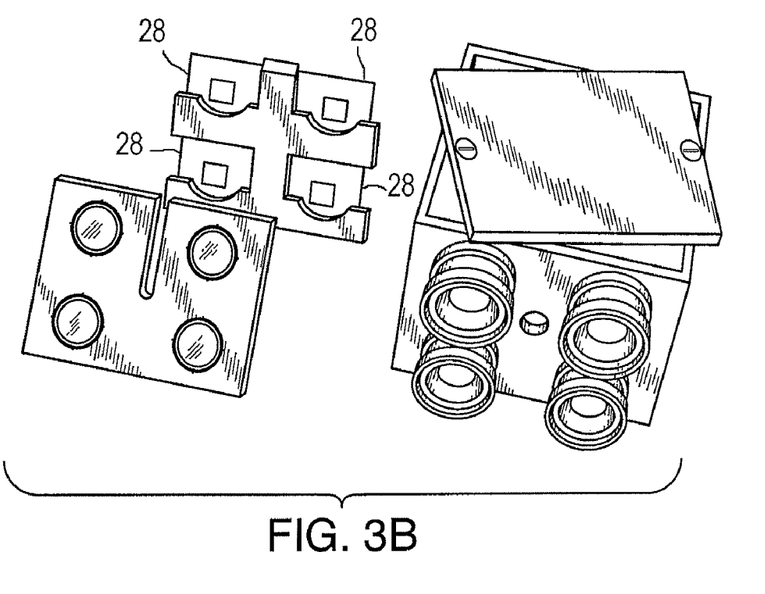
FIG. 3B shows the camera plate of FIG. 3A with the cameras attached.
Figure 4:
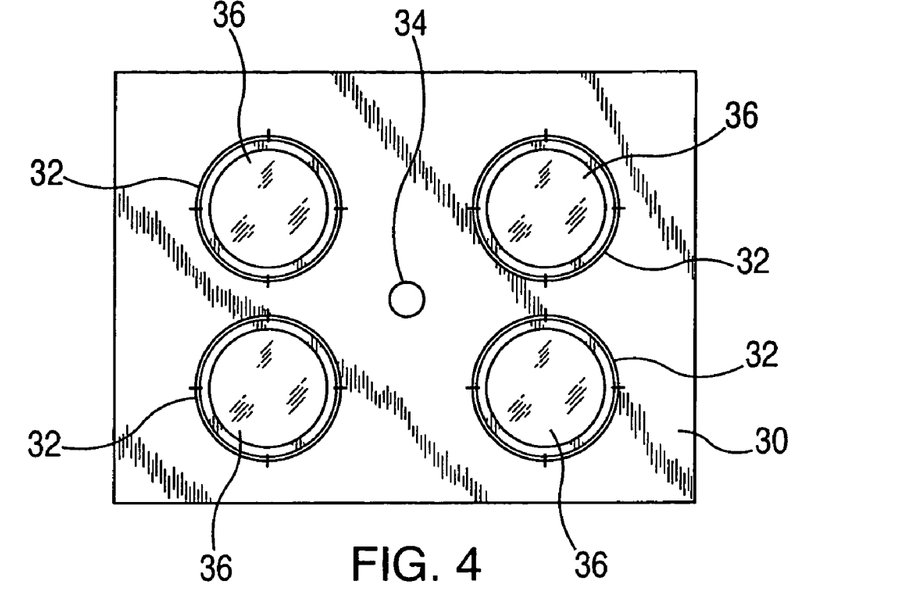
FIG. 4 shows a filter plate according to the first embodiment of the invention.
Figure 5:
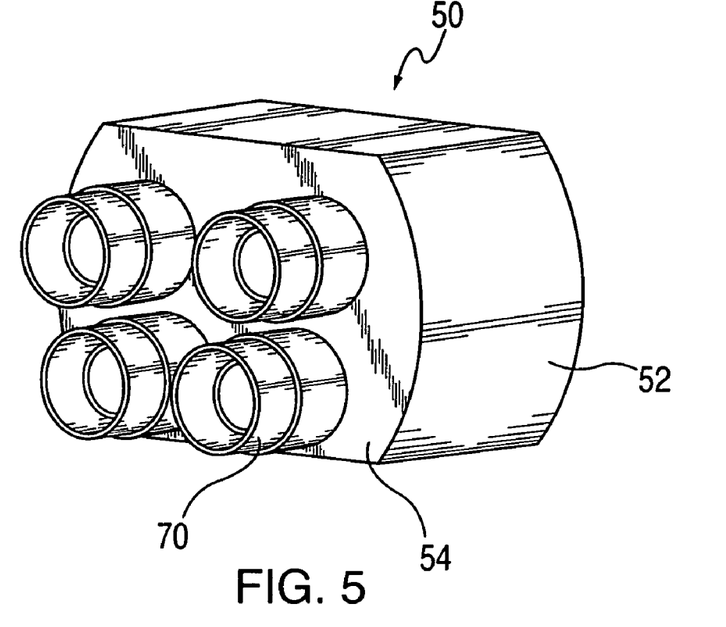
FIG. 5 shows a perspective view of a sensor assembly according to a second embodiment of the invention.
Figure 6:
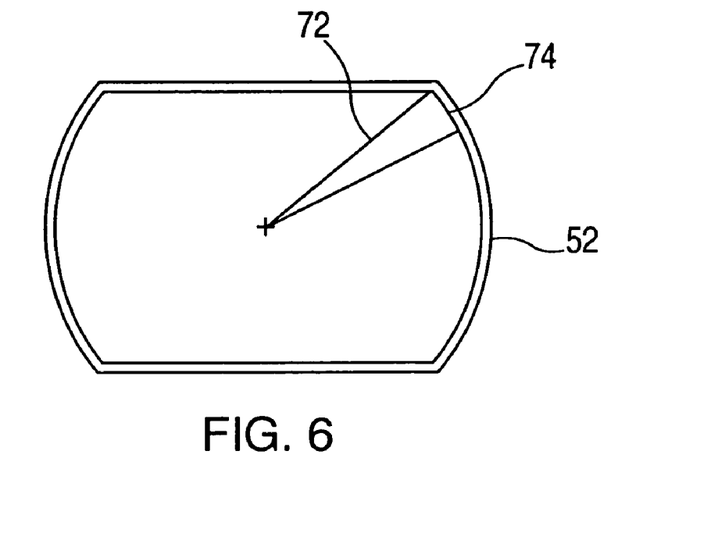
FIG. 6 shows a shell of the sensor assembly of FIG. 5.
Figure 7:
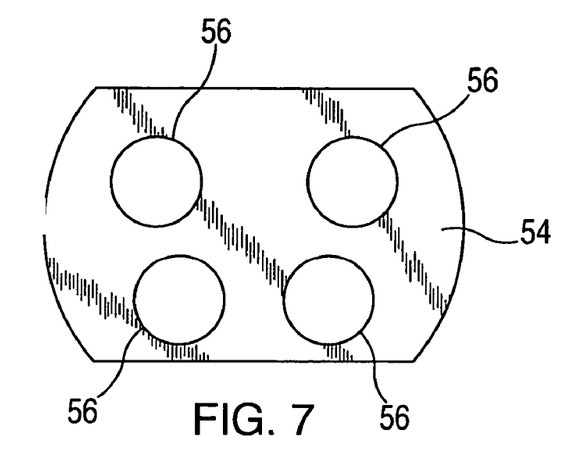
FIG. 7 shows a lens plate according to the second embodiment of the invention.

Referring to FIGS. 3A-3B, a camera plate 22 preferably contains two cutout portions 24, with each cutout portion 24 including a notch 25. Each notch 25 permits an imager 28 to be mounted therein. Each notch 25 is aligned with each lens 38. Referring to FIG. 4, a filter plate 30 includes four holes 32 and an alignment hole 34. Each hole 32 receives a filter 36. When assembled, filter plate 30 is inserted into housing 12 between the front of housing 12 and camera plate 22. Light enters sensor 10 through lenses 38, passes through filters 36, and is received by imagers 28. Housing 12 includes space for the electronics necessary to synchronize and trigger imagers 28. Sensor housing 12 also provides all external connections to imagers 28 and associated electronics.

Imagers 28 are preferably CMOS cameras such as the M3 1 88A manufactured by COMedia, Ltd. in Hong Kong. The clock crystals and optics of the M3 1 88A are removed before installation into sensor 10. The M3188A is a ⅓" B/W camera module with digital output, using Omni Vision's CMOS image sensor OV7 120. The digital video port supplies a continuous 8-bit wide image data stream. All camera functions such as exposure, gamma, gain, and windowing, are programmable through the $I^2C$ (InterIntegrated Circuit) interface.

The first embodiment sensor is spectrally selectable by the user, simply by choosing the appropriate filters 36 for filter plate 30. Filters 36 are preferably user selectable spectral or polarization filters. CMOS imagers 28 support spectral ranges of visible to near infrared, that is, sensor 10 can be used to image spectra from 400 nm to 1000 nm. Sensor 10 can also be used to collect polarimetric data without the need of determining the sensor Mueller matrix prior to collecting polarimetric imagery. This is done by simply inserting polarizers appropriately into filter plate 30. Finally, the field of view of sensor 10 is determined by the selection of lenses 38 employed on the front of sensor 12.

Sensor 10 produces both interlaced and progressive scan RS-170 analog data. Digital data can be supplied with the appropriate selection of CMOS and/or CCD cameras (imagers). Sensor 10 also has the ability to easily establish sensor gain, manually or automatically, and select the camera operational mode.

Sensor 10 is not a common aperture imager. Therefore, due to the spatial positioning of the individual imagers 28, a registration solution at infinity produces registration errors in the near-field. This near field registration effect may be used to generate range information. A key advantage to sensor 10, besides being low-cost, lightweight, low-power, and spectrally adaptable, is the ability of CMOS imagers 28 to individually address pixels independently, making it possible for basic spectral processes to be implemented prior to digitization. A fast analog process easily competes with a digital process in terms of speed and this avoids quantization error in the analog to digital conversion for limited bit systems. Creative electronic design combines these basic functions into just about any complex process. In addition, since CMOS imagers 28 use the same semiconductor substrate as processing chips, the sensor and the processor, either analog or digital, can be implemented on a single piece of silicon.

Referring to FIGS. 5-10, a second embodiment of the invention is an enhanced version of the first embodiment. As in the first embodiment, the second embodiment includes three main components; i.e., a sensor 50 includes a camera plate 64, a filter plate shown as a filter wheel 58, and a sensor housing shown as a shell 52. Lens plate 54, either integral with shell 52 or one-piece with it. supports four C-Mount lenses 70 in four holes 56, which are positioned to cooperate with filter wheel 58 in a unique fashion. The original four-slot filter plate 30 of the first embodiment is replaced with a 16-position filter wheel 58. Filter wheel 58, in conjunction with the sensor layout, provides sixteen unique spectral and/or polarization band sets. Note that the lenses are positioned so that each lens 70 always lines up with a filter element 60 in filter wheel 58 and its associated imager 68. A radius 72 describing a corresponding arc 74 which defines the shape of the sides of shell 52 permits lenses 70 mounted in holes 56 to be aligned with filter elements 60. The asymmetry in the location of lenses 70 permits 16 unique filter sets.

Figure 9:
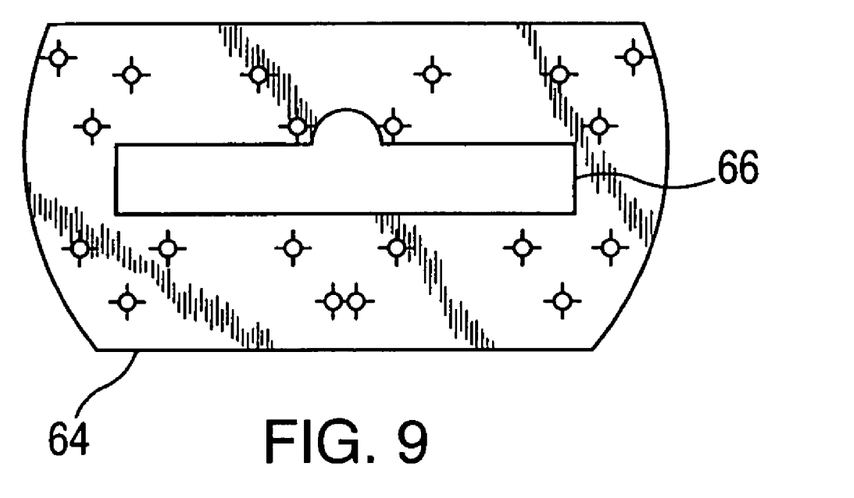
FIG. 9 shows a camera plate according to the second embodiment of the invention.
Figure 10:
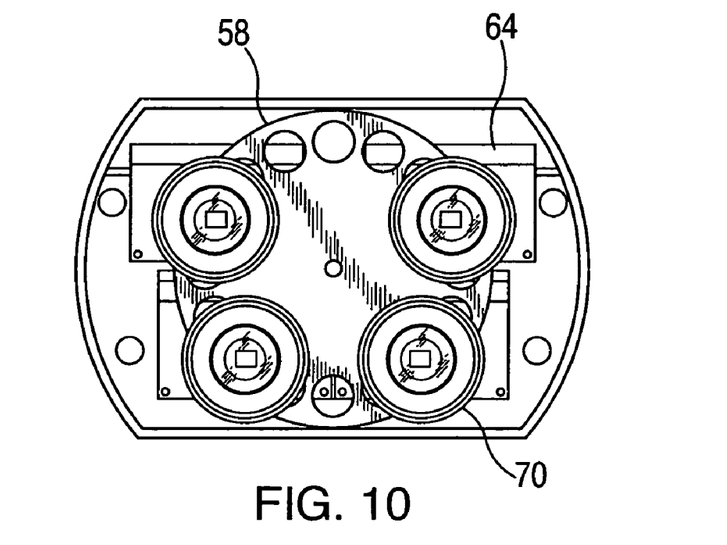
FIG. 10 shows a front elevation view of the sensor assembly of FIG. 5 with the lens plate removed.

Camera plate 64 hosts four CMOS or CCD cameras, shown as imagers 68, in a unique configuration to enhance the sensor capability. A cutout portion 66 accommodates wires to connect imagers 68 with the processing electronics. The second embodiment maintains the benefits of its predecessor and provides greater capabilities in a small, light weight package with similar power requirements.

Figure 8:
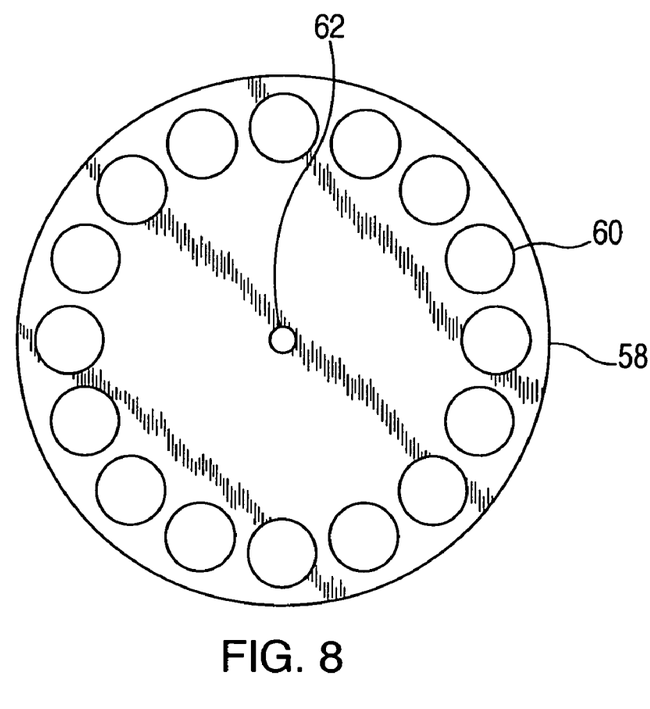
FIG. 8 shows a filter plate according to the second embodiment of the invention.

A shaft hole 62 in filter wheel 58 accommodates a shaft (not shown) that is preferably connected to a motor such as a DC stepper motor (not shown) which is interfaced to a computer 80 so that filter wheel 58 can be moved to align different sets of filters 60 without opening sensor 50. The initial positioning and alignment, i.e., calibration, of filter wheel 58 is preferably done at the factory, with the sets of filters chosen for whatever particular application the user has in mind. Four sets of four filter sets would available on one filter wheel 58, or a combination of full filter sets and partial filter sets. For instance, if sensor 50 is to be used in an aircraft overflying an area performing a search and rescue operation, the filter sets would include color filters chosen to obtain data optimizing finding a person in the midst of foliage, sand, dirt, and/or water. For polarization studies, a complete set of polarizing filters would use four filters, with two filters being linear filters orthogonal to each other, and with the other two filters being circularly polarized, one clockwise and the other counterclockwise. For some applications, only linearly polarized filters would be used, with the filters being polarized 45 degrees apart. The flexibility of the filter wheel supports many options.

There is significant benefit in data collected by the systems. Sensors 10 and 50 provide (1) narrow bandwidth spectral data for spectral target detection capabilities, (2) polarization data to enhance the ability to detect targets in shadows and increase the detection capabilities of man-made objects, and (3) since the apertures are not coincident, the systems provide stereographic imaging capabilities inherently determining relative distances from the collected imagery through the use of software known in the imaging art. Finally, the systems are extendable to house small LWIR (long wave infrared) microbolometer sensors to further increase sensor capabilities. The first and second embodiments also support gathering the image data necessary for multispectral imaging, such as is disclosed in U.S. Pat. No. 6,539,126 (Socolinsky et al.) issued on Mar. 25, 2003 and entitled VISUALIZATION OF LOCAL CONTRAST FOR N-DIMENSIONAL IMAGE DATA, incorporated herein by reference.

Figure 11:
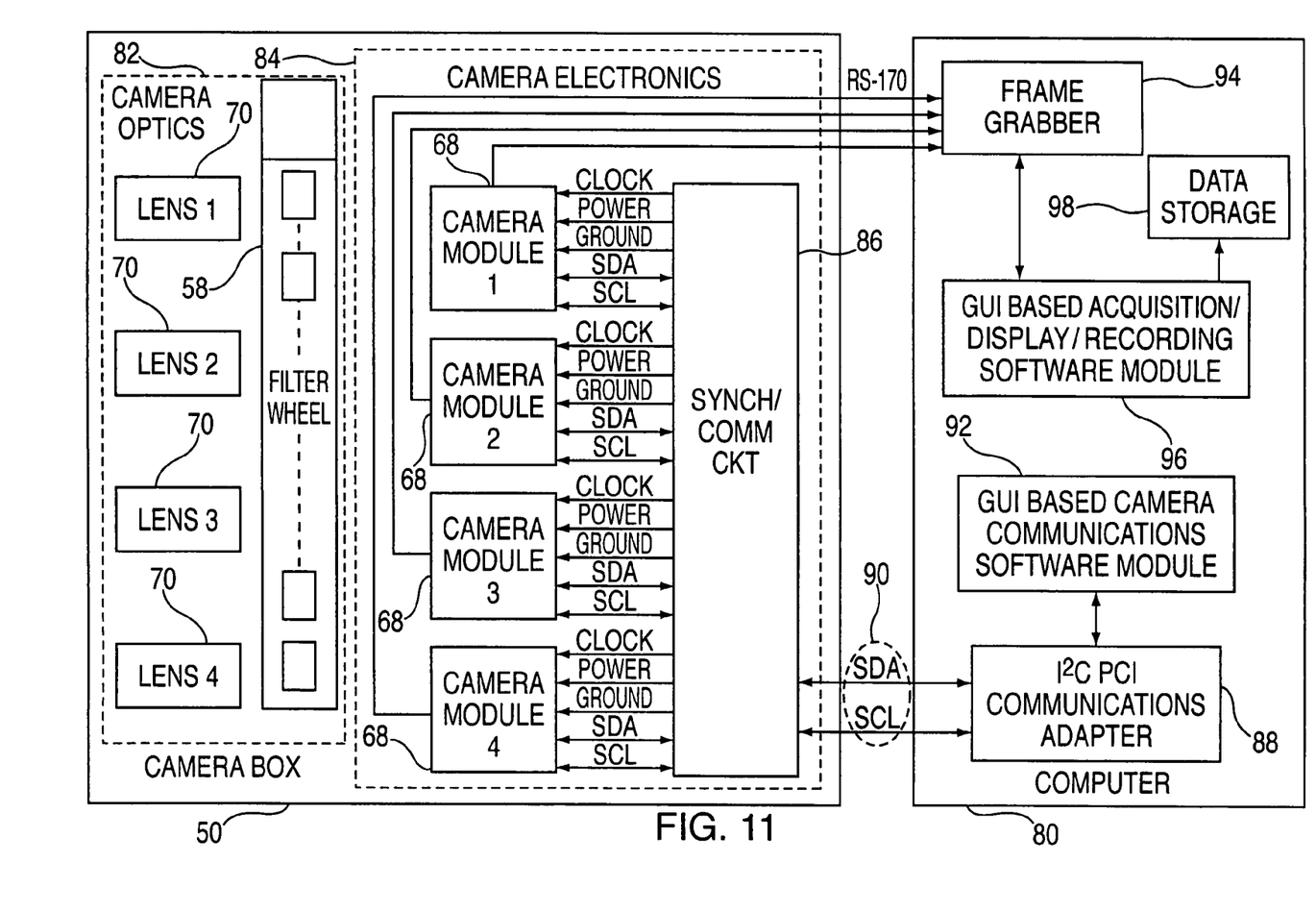
FIG. 11 shows a block diagram of the sensor system according to both embodiments of the invention.
Figure 12A:
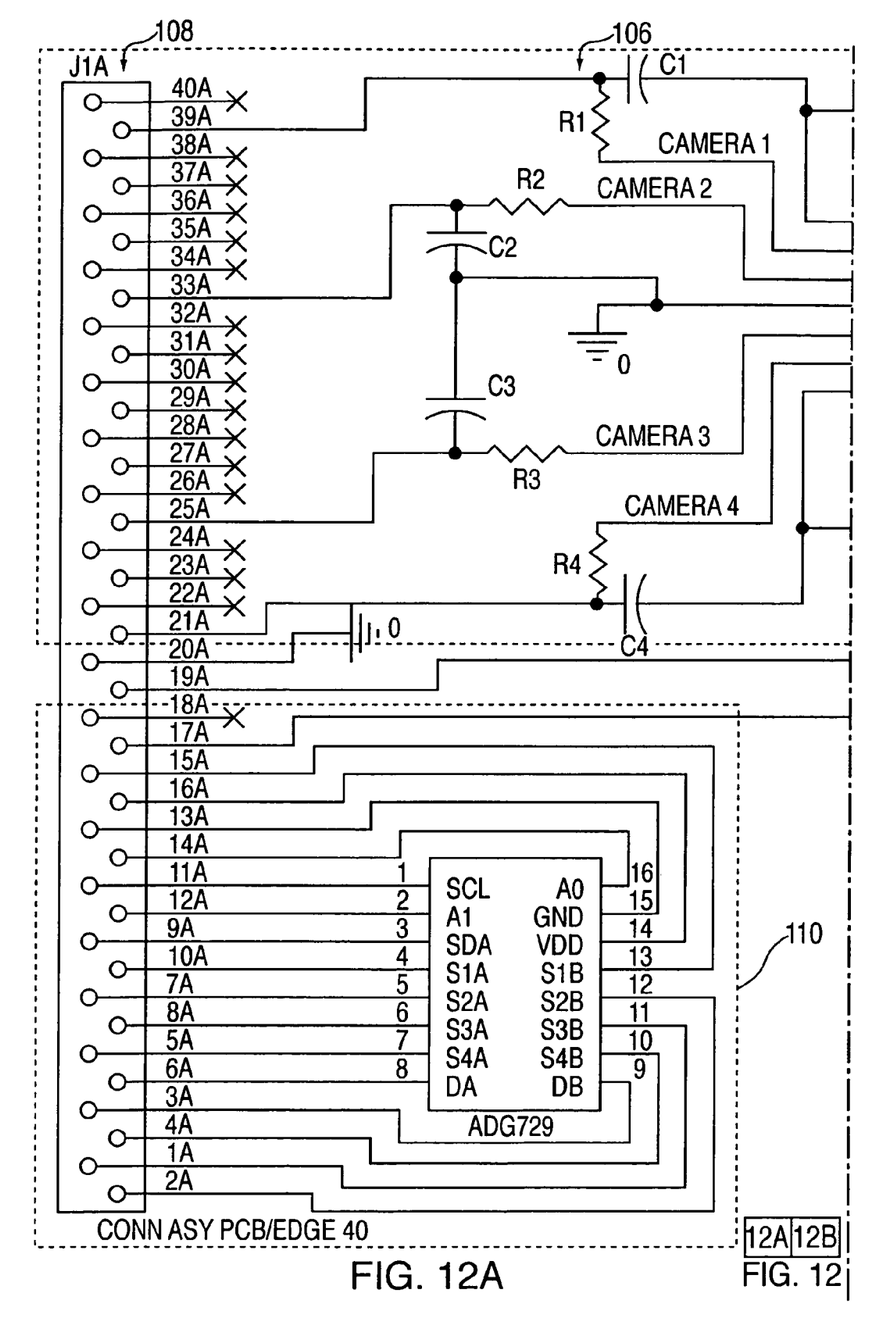
FIGS. 12A and 12B show schematics of synchronization and communication circuits used in both embodiments of the invention.
Figure 12B:
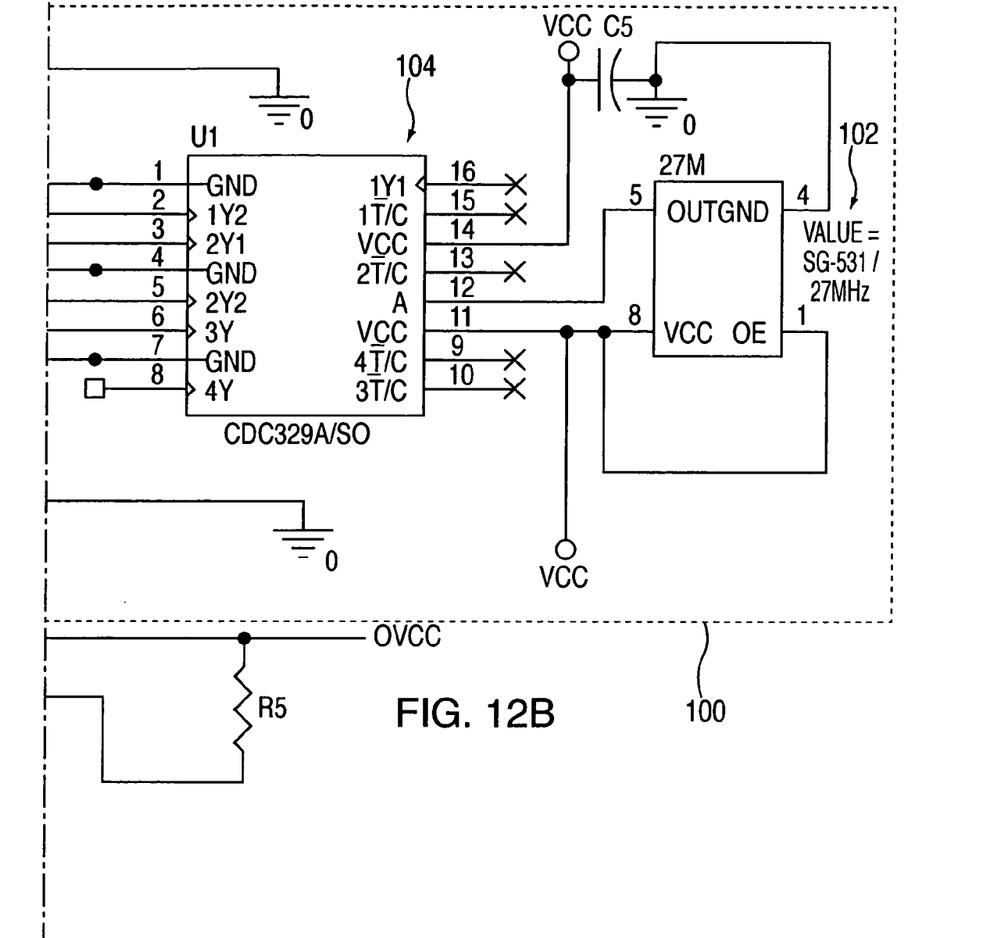

Referring to FIG. 11, a block diagram of a complete sensor system is shown in which we use the second embodiment as the example, although the system applies to both embodiments. Sensor 50 includes two sections, camera optics 82 which includes lenses 70 and filter wheel 58 with its associated filters, and camera electronics 84 which includes imagers 69 and a synchronization /communications circuit 86. An embodiment of synchronization /communications circuit 86 is shown in more detail in FIG. 12. A computer 80 includes an I2C PCI communications adapter 88 such as the Calibre I2C Communications Adapter, Model PC 190 manufactured by Calibre UK Ltd,. Cornwall House, Cornwall Terrace, Bradford, West Yorkshire in the United Kingdom. Communication between computer 80 and synchronization/communications circuit 86 is carried out over an I2C bus 90. GUI-based software in GUI-based camera communications software module 92, developed by the applicants, accommodates user control of imagers 68 in a Microsoft Windows® environment using Windows® software libraries, source code, and object code from Calibre UK Ltd.

Computer 80 also preferably includes a frame grabber 94 which captures simultaneously the outputs from the RS-170 outputs of imagers 68 at a 30 Hz rate using a 4-channel bitflow Raven™ PCI Frame Grabber, Model no. RAV-PCI-440-VNS, manufactured by BitFlow, Inc. of Woburn, Mass. The separate camera outputs form imagers 68 are essentially treated as though they are separate channels or taps from a single virtual camera, in this case, sensor 50. GUI-based software in GUI-based acquisition /display /recording software module 96, developed by the applicants, accommodates the real-time acquisition, display, and recording of the sensor 50 image data in a Microsoft Windows® environment using frame grabber 94. The data is stored in a data storage medium 98. The developed software in module 96 includes the use of Windows® software libraries, source code, and object code from the Bitflow, Inc. Software Development Kit version 3.0. The software in module 96 manipulates the images, including forming the composite image using techniques well known in the art.

The schematic of FIG. 12 actually shows two circuits. Synchronization/communications circuit 86 includes a synchronization circuit 100 which preferably includes a 27 MHz clock 102 which feeds a clock signal into a clock buffer/splitter 104 such as the CDC329A chip manufactured by Texas Instruments, Dallas, Tex. The CDC329A chip takes the clock signal and splits it up into six identical signals. Only four of the signals are used, which are fed to a group of resistor capacitor (RC) filters 106. The output signal from RC filters 106 then goes into a connector 108 which eventually goes to the cameras (imagers 68) and keeps them all on the same clock cycle.

Synchronization/communications circuit 86 also includes a communication circuit 110 which preferably uses the ADG729 chip, manufactured by Analog Devices, Norwood, Mass. The ADG729 is a CMOS analog matrix switch with a serially controlled two-wire interface. It is a dual four-channel matrix switch. ON resistance is closely matched between switches and very flat over the full signal range. This part operates equally well as a multiplexer, demultiplexer or switch array and the input signal range extends to the supplies. Each channel is controlled by one bit of the data byte, which means that these multiplexers can be used in a number of different configurations with all, any, or none of the channels on at any one time. On power up of the device, all switches will be in the OFF condition and the internal shift register will contain all zeros. All channels exhibit break before make switching action preventing momentary shorting when switching channels. For the first and second embodiments, the ADG729 chip essentially works like a switch. When the computer gives it a certain address it opens either one, two, three, or all four switches in the circuit allowing the communication to the cameras to control multiple options.

While the present invention had been described with reference to a particular preferred embodiment and the accompany drawings, it will be understood by those skilled in the art that the invention is not limited to the preferred embodiment and that various modifications and the like could be made thereto without departing from the scope of the invention as defined in the following claims.

What is claimed is:

1. A tunable imaging sensor, comprising:
a housing;
a lens plate attached to a front of said housing;
a filter plate inside said housing adjacent said lens plate;
a camera plate inside said housing adjacent said filter plate;
a plurality of imagers mounted on said camera plate;
a plurality of lenses mounted on said lens plate;
a plurality of filters mounted on said filter plate;
wherein said lens plate, said filter plate, and said camera plate being aligned such that radiation passing through each of said lenses passes through a respective, optically aligned one of said plurality of filters onto a respective, optically aligned one of said imagers; and
wherein each of said plurality of filters that optically align with said respective ones of said imagers is user-selectively changeable.

2. A sensor according to claim 1, wherein said plurality of imagers consists of four imagers, said plurality of lenses consists of four lenses, and said plurality of filters consists of four filters.

3. A sensor according to claim 2, wherein at least two of said four filters are each sensitive to a different wavelength of radiation.

4. A sensor according to claim 2, wherein at least two of said four filters are each sensitive to a different form of radiation.

5. A sensor according to claim 2, wherein said plurality of imagers are CMOS imagers.

6. A sensor according to claim 1, wherein said filter plate is rotatable such that rotating said filter plate brings a different one of said plurality of filters into alignment with one of said lenses and one of said imagers.

7. A sensor according to claim 6, wherein said plurality of imagers consists of four imagers, said plurality of lenses consists of four lenses, and said plurality of filters consists of sixteen filters.

8. A sensor according to claim 7, wherein rotating said filter plate brings a different group of four filters into alignment with said plurality of lenses and said plurality of imagers.

9. A sensor according to claim 8, wherein said filter plate is connected to a shaft of a stepper motor.

10. A tunable imaging sensor system, comprising:
a housing;
first means for mounting a plurality of lenses in said housing;
second means for mounting a plurality of filters adjacent said plurality of lenses in said housing;
third means for mounting a plurality of imagers adjacent said plurality of filters in said housing;
wherein said first means, said second means, and said third means are aligned such that radiation passing through each of said lenses passes through a respective, optically aligned one of said plurality of filters onto a respective, optically aligned one of said imagers; and
wherein each of said plurality of filters that optically align with said respective one of said imagers is user-selectively changeable.

11. A system according to claim 10, further comprising:
a computer including a frame grabber which receives a plurality of outputs from said plurality of imagers; and
a synchronization and communications circuit connecting a communications adapter in said computer to said plurality of imagers.

12. A system according to claim 11, in which said computer includes means for processing said plurality of outputs from said plurality of imagers.

13. A system according to claim 12, wherein said plurality of imagers consists of four imagers, said plurality of lenses consists of four lenses, and said plurality of filters consists of sixteen filters.

14. A system according to claim 13, wherein rotating said second means brings a different group of four filters into alignment with said plurality of lenses and said plurality of imagers.

15. A system according to claim 14, wherein said second means is connected to a shaft of a stepper motor, and said stepper motor is controlled by said computer.

\* \* \* \* \*